United States Patent
Bendapudi et al.

(10) Patent No.: US 8,032,617 B2
(45) Date of Patent: Oct. 4, 2011

(54) APPLICATION SETTINGS MIGRATION USING VIRTUALIZATION

(75) Inventors: Perraju Bendapudi, Hyderabad (IN); Vijayendra G. Vasu, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 11/696,916

(22) Filed: Apr. 5, 2007

(65) Prior Publication Data

US 2008/0250254 A1 Oct. 9, 2008

(51) Int. Cl.
- G06F 15/177 (2006.01)
- G06F 15/173 (2006.01)
- G06F 1/12 (2006.01)
- G06F 9/00 (2006.01)

(52) U.S. Cl. ........ 709/221; 709/220; 709/222; 709/223; 713/100

(58) Field of Classification Search .................. 713/100; 709/220–223

See application file for complete search history.

(56) References Cited

U.S. PATENT DOCUMENTS

| | | | |
|---|---|---|---|
| 6,161,176 A | 12/2000 | Hunter et al. | |
| 6,182,212 B1 | 1/2001 | Atkins et al. | |
| 6,370,646 B1 | 4/2002 | Goodman et al. | |
| 6,728,877 B2 | 4/2004 | Mackin et al. | |
| 6,735,691 B1 | 5/2004 | Capps et al. | |
| 6,920,555 B1 | 7/2005 | Peters et al. | |
| 6,926,199 B2 | 8/2005 | Jay et al. | |
| 7,028,079 B2 | 4/2006 | Mastrianni et al. | |
| 2002/0010808 A1 | 1/2002 | Wiggins et al. | |
| 2002/0104080 A1* | 8/2002 | Woodard et al. | 717/176 |
| 2003/0074386 A1 | 4/2003 | Schmidt et al. | |
| 2005/0144528 A1* | 6/2005 | Bucher et al. | 714/38 |
| 2006/0026587 A1 | 2/2006 | Lemarroy et al. | |

OTHER PUBLICATIONS

Grolaux et al., "Migratable User Interfaces: beyond migratory interfaces," Aug. 2004, 9 pages.
Smith, Jonathan M., "A Survey of process Migration Mechanisms," vol. 22, Issue 3, Jul. 1998, 13 pages.
Fogle et al., "The Easy Way to Move Windows Profiles and Data," SIGUCCS'06, 2006, 3 pages, Canada.
Ruest et al., "Migrating to Windows Vista Through the User State Migration Tool," Microsoft TechNet, 2007, 10 pages, Microsoft Corporation, USA.
Unknown, "HP OpenView Settings Migration Manager," Data Sheet, 2006, 4 pages, Hewlett-Packard Development Company, L.P., USA.

* cited by examiner

*Primary Examiner* — Yemane Mesfin
*Assistant Examiner* — Carlos Perez
(74) *Attorney, Agent, or Firm* — Senniger Powers LLP (57) ABSTRACT

Application setting virtualization for a user. Application settings from a source computer are copied to a user-specific location on a destination computer and layered under corresponding application settings associated with one or more applications installed on the destination computer. In response to receiving a request from an application for an application setting, the requested application setting is retrieved from the layered application settings such that the layers are searched in order for the requested application setting and the first application setting found is retrieved and returned to the requesting application.

10 Claims, 6 Drawing Sheets

APPLICATION SETTINGS MIGRATION USING VIRTUALIZATION

BACKGROUND

Computer users often change the computers because of hardware failures, upgrades to newer hardware, and the like. In such situations, a user usually wishes to transfer custom changes made on one computer to the next to reduce loss of productivity. These changes, collectively referred to as user state, include the user's documents and the changes he or she has made to operating system and application settings.

Computer administrators are normally charged with the task of gathering the user state for future restoration on a replacement computer or upgraded computer. Generally, script driven migration tools are available but require an administrator to identify the location of files and registry keys that make up the user state. Once the administrator provides the required location information to the migration tool, the tool gathers the files and registry keys for the administrator.

However, it can be difficult for an administrator to identify the location of application settings because there is no standard location for storing them. In other words, each application determines the storage location of its settings. The typical storage locations of application settings include a central database of the operating system (e.g., the registry) or a file system of the computer. Also, there is no easy way to distinguish the settings of an application from other information, so even exhaustive searches of the central database or the file system will not necessarily yield the required information. Typically, because of all the uncertainty, the migration of application settings is a difficult and time consuming process.

One approach to migrating application settings requires the administrator to author a separate migration script for each application to be migrated. Given that authoring migration scripts is not easy (as discussed in the previous paragraph) and that typical enterprises have hundreds if not thousands of distinct applications whose settings are to be migrated, this approach is clearly not scalable. As a compromise, most administrators usually end up migrating the settings of applications supported out of the box by the migration tool and author extra scripts for the most important subset of their enterprise applications. Unfortunately, the rest of the application settings are simply not migrated.

Another approach is to copy all setting from the central database and the file system directories associated with the applications. However, in addition to migrating the required settings, this approach will migrate the settings of applications that should not be migrated as well (e.g., applications that have been previously removed from the source computer or applications that will not be installed on the new computer). Also, machine specific information such as settings of operating system components would also be migrated causing the destination computer to be improperly configured. For example, suppose the database contains the user's file type-to-application mapping (e.g., the information that .wav files should be opened with a particular audio player). If this setting is migrated and the particular audio player is not installed on the destination computer, opening a .wav file on the destination computer would produce undesirable results.

SUMMARY

Embodiments of the invention overcome one or more difficulties of migrating application settings from a source computer to a destination computer by layering the application settings from the source computer under the application settings of the destination computer. Aspects of the invention associate a plurality of application settings available to an application on the destination computer with a higher layer and associate another plurality of application settings copied from the source computer to a lower layer on the destination computer. And, when an application executed on the destination requests an application setting, aspects of the invention search the layers of application settings in order (higher to lower) and return the first found value for the application setting to the application.

Aspects of the invention also include copying application settings of the lower layer to the higher layer as the application requests the application setting and then deleting the application setting from the lower layer.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

DETAILED DESCRIPTION

Figure 1:
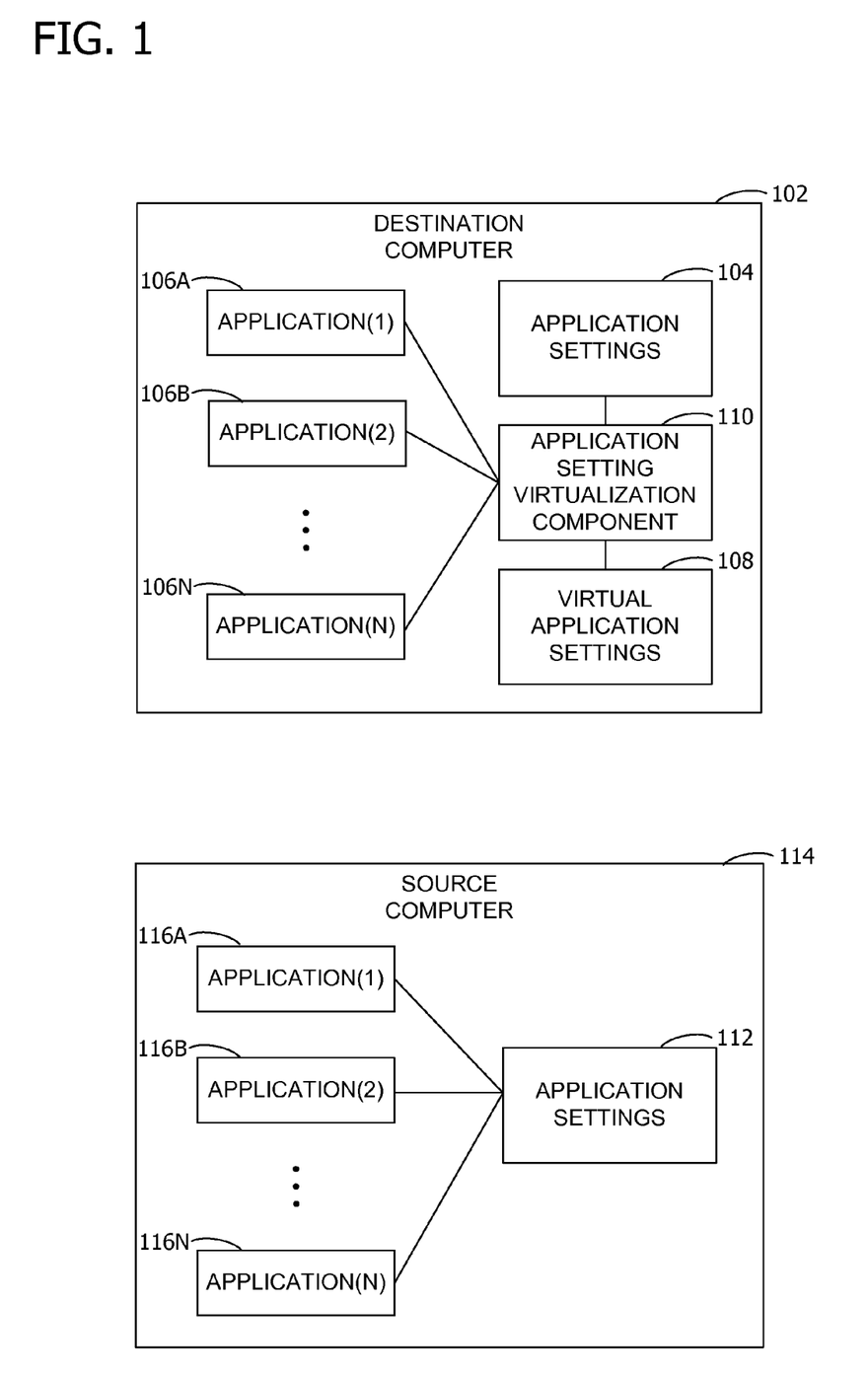
FIG. 1 is a block diagram illustrating one example of a suitable computing system environment in which aspects of the invention may be implemented.

Referring now to the drawings, FIG. 1 illustrates a system for application setting virtualization for a user of a destination computer 102 according to aspects of the invention. The system includes a first storage location for application settings 104 associated with one or more applications 106, a second storage location for virtual application settings 108 associated with at least one of the applications 106, and an application settings virtualization component 110.

In another embodiment, the destination computer 102 includes a database 604 (see FIG. 6) containing the application settings 104 for the one or more applications 106 and an operating system component for continually referencing the database 604 during operation. The database 604 includes one or more of the following: a profile for the user, application settings 104, types of documents that the user can create, a property sheet setting for folders and application icons of the user, hardware identifiers, port identifiers, etc.

The virtual application settings 108 of the user are copied from the application settings 112 of a source computer 114. The applications settings 112 are associated with one or more applications 116 of the source computer 114. In an embodiment, the applications 116 of the source computer 114 are the same as the applications 106 of the destination computer 102. Alternatively, one or more of the applications 106 of the destination computer 102 are different from the applications 116 of the source computer 114. In another embodiment, the source computer 114 includes a database 612 (see FIG. 6) containing the application settings 112 for the one or more applications 116 and an operating system component for continually referencing the database 612 during operation. The database 612 includes one or more of the following: a profile for the user, application settings 112, types of documents that the user can create, a property sheet setting for folders and application icons of the user, hardware identifiers, port identifiers, etc.

For purposes of illustration, programs and other executable program components (e.g. applications 106, applications 116, and application settings virtualization component 110) are illustrated herein as discrete blocks. It is recognized, however, that such programs and components (e.g. applications 106, applications 116, and application settings virtualization component 110) reside at various times in different storage components of the computer (e.g., destination computer 102, source computer 114), and are executed by the data processor(s) of the computer (e.g., destination computer 102, source computer 114).

In another embodiment, the user is upgrading from the source computer 114 to the destination computer 102. In an alternative embodiment, the source computer 114 and the destination computer 102 are the same computer, but the destination computer 102 has received new hardware components that require a re-installation of the operating system and applications of the source computer 114 (e.g. a replacement system disk). In another alternative embodiment, the source computer 114 and the destination computer 102 are the same, identical computer; however, the operating system and applications of the source computer 114 have been installed afresh on the destination computer 102 (e.g., when a newer version of the operating system is being installed).

The application settings virtualization component 110 receives a request from the at least one of the applications 106 for an application setting and searches the first storage location 104 for the requested application setting. In an embodiment, the requested application setting comprises at least one of the following: a default value initialized the first time the user executes the requesting application and a customized value specified by the user. In another embodiment, the system includes a first layer from which the requesting application accesses the application settings located at the first storage location and a second layer under the first layer from which the requesting application accesses the corresponding application settings located at the second storage location.

If the requested application setting is found in the first storage location 104, the application settings virtualization component 110 returns the requested application setting from first storage location 104. If not, application settings virtualization component 110 searches the second storage location 108 for the requested application setting and returns the requested application setting from the second storage location 108.

In an alternative embodiment, if the requested application setting is not found in the first storage location 104, the application settings virtualization component 110 copies the requested application setting from the second storage location 108 to a corresponding application setting at the first storage location 104 and deletes the requested application setting from the second storage location 108. Next, the application settings virtualization component 110 returns the copied application setting from the first storage location 104.

The computers (e.g., destination computer 102, source computer 114) illustrated in FIG. 1 have at least some form of computer readable media. Computer readable media, which include both volatile and nonvolatile media, removable and non-removable media, may be any available medium that may be accessed by computer (e.g., destination computer 102, source computer 114). By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., destination computer 102, source computer 114).

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Figure 2:
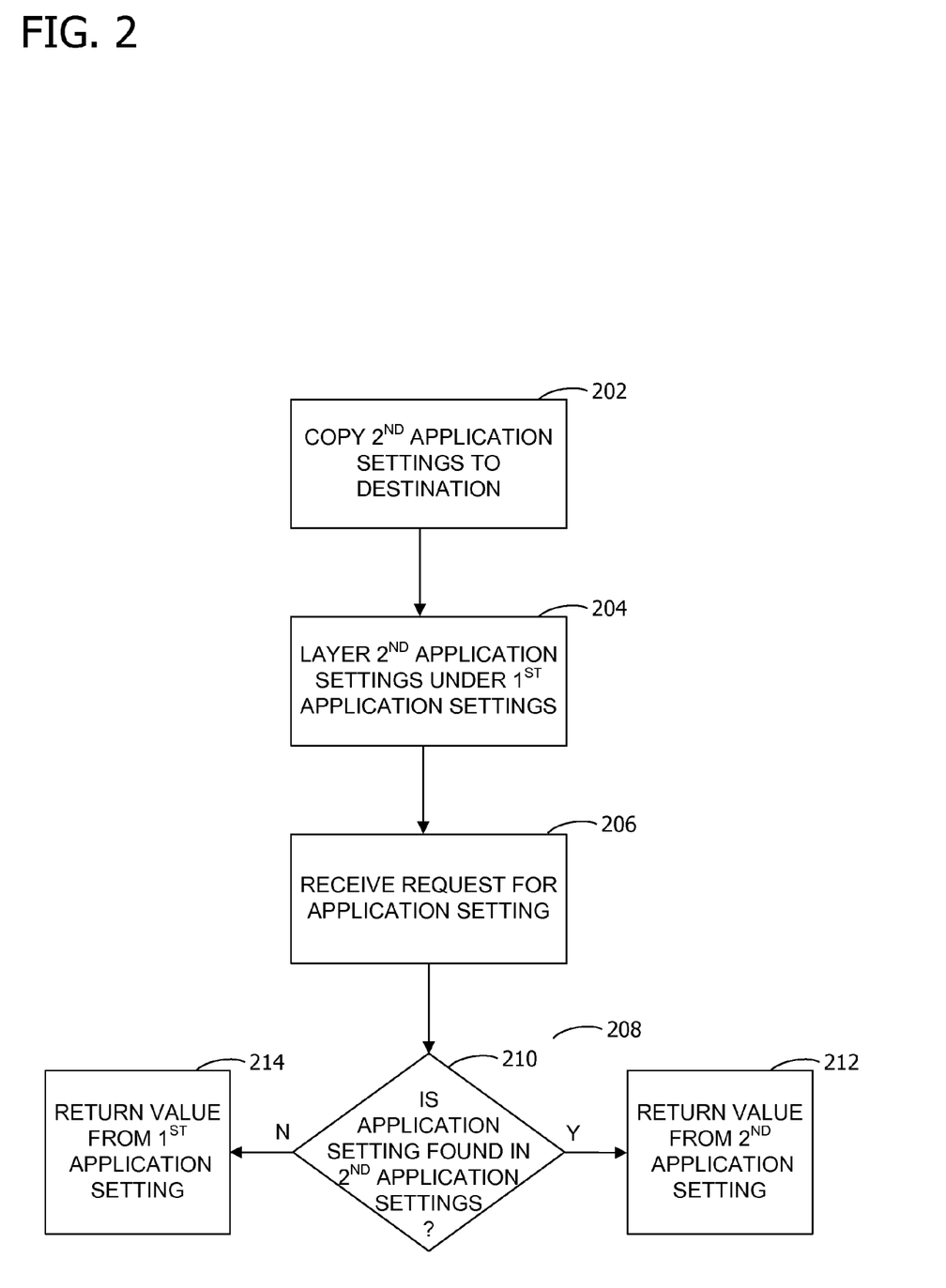
FIG. 2 is an exemplary flow diagram for application setting virtualization for a user.
Figure 3:
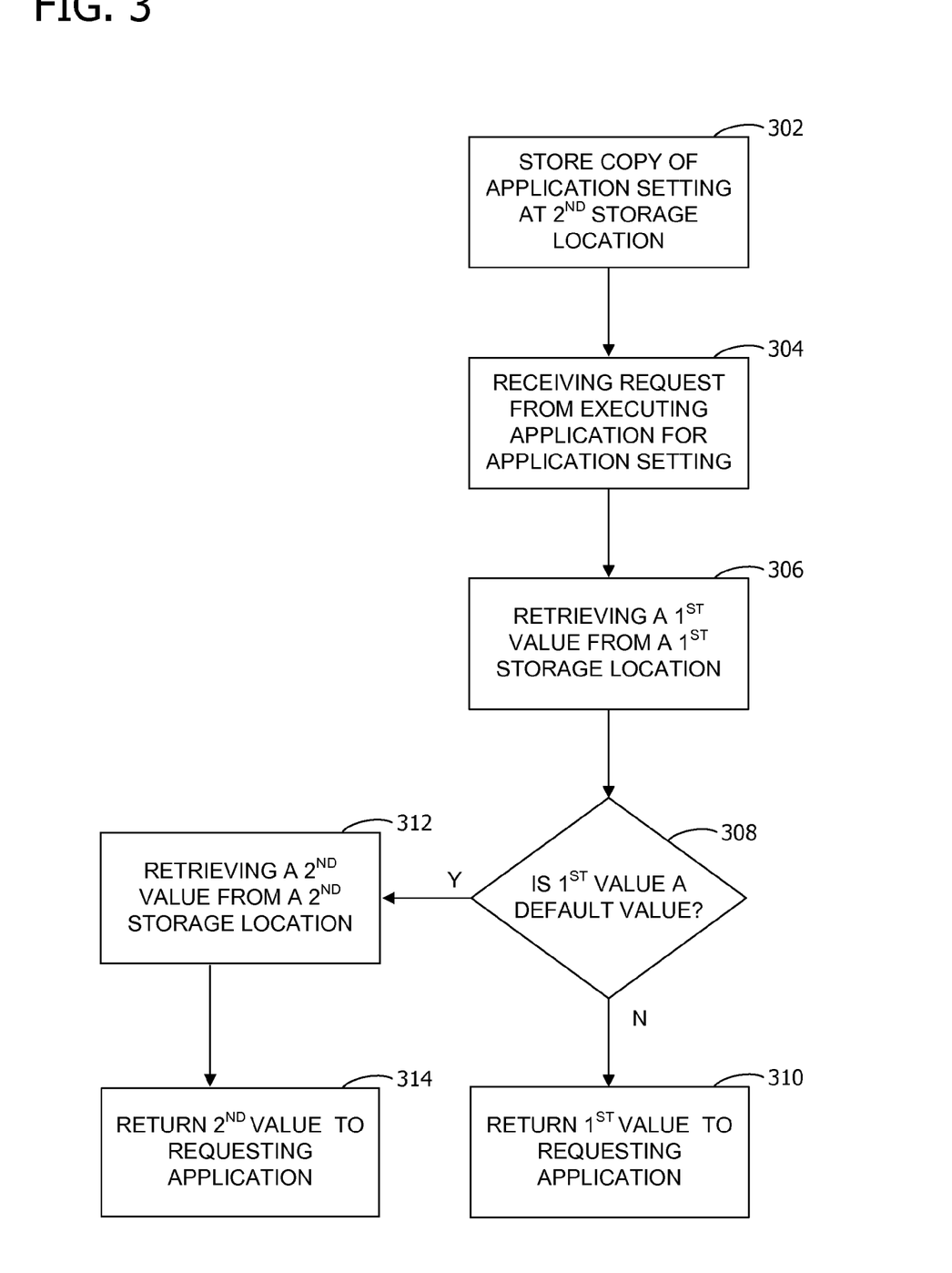
FIG. 3 is an exemplary flow diagram for migrating application settings of a user.

FIGS. 2 and 3 illustrate exemplary methods embodying aspects of the invention in the form of flow diagrams. Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices. In operation, computer (e.g., destination computer 102, source computer 114) executes computer-executable instructions such as those illustrated in the figures to implement aspects of the invention.

Referring now to FIG. 2, a method for application setting virtualization for a user is illustrated. At 202, the application settings virtualization component 110 copies a plurality of application settings 112 (i.e., the second plurality of application settings) from a source computer 114 to a user-specific location 108 on a destination computer 102. The second plurality of application settings 112 are associated with one or more applications 116 installed on the source computer 114. In an embodiment, the second plurality of application settings 112 are stored in one or more of the following locations: a database 612 (see FIG. 6) associated with an operating system of the source computer and an application data directory of the source computer.

At 204, the application settings virtualization component 110 layers the copied second plurality of application settings 108 under a corresponding of application settings 104 (i.e., the first plurality of application settings). In an embodiment, the second plurality of application settings 112 were customized for an application 116 installed on the source computer 114. In another embodiment, the application 116 is uninstalled from the source computer 114 but the second plurality of application settings 112 are not uninstalled.

The first plurality of application settings 104 are associated with one or more applications 106 installed on the destination computer 102. In an embodiment, the first plurality of application settings 104 are stored in one or more of the following locations: a database 604 (see FIG. 6) associated with an operating system of the destination computer and an application data directory of the destination computer. Alternatively, the copied second plurality of application settings 108 are layered under the corresponding first plurality of application settings 104 in response to the user logging into the destination computer.

At 206, the application settings virtualization component 110 receives a request from at least one of the applications 106 installed on the destination computer 102 for an application setting. If the requested application setting is found in the first plurality of application settings 104 at 208, the application settings virtualization component 110 returns the requested application setting from the first plurality of application settings 104 in response to the request.

Alternatively, if the requested application setting is not found in the first plurality of application settings 104 at 208, the application settings virtualization component 110 returns the requested application setting from the second plurality of application settings 108 in response to the request. Advantageously, the application settings are migrated to the destination computer 102 without having to write migration scripts on a per-application basis.

In an embodiment, the application settings virtualization component 110 copies the requested application setting from the second plurality of application settings 108 to a corresponding application setting in the first plurality of application settings 104 and deletes the requested application setting from the second plurality of application settings 108. In this embodiment, the application settings virtualization component 110 returns the copied application setting from the first plurality of application settings 104 in response to the request. In this manner, application settings are migrated as they are requested by an application 106 executing on the destination computer 102. And after a period of time, the migrated application settings needed by the applications executed by the user will be migrated to the first plurality of application settings 104. At this time, to conserve system resources, the application settings virtualization component 110 may stop execution and the remaining second plurality of applications settings 108 may be deleted from the destination computer 102. In an embodiment, the application settings virtualization component 110 may stop execution and the remaining second plurality of applications settings 108 may be deleted from the destination computer 102 after a period of time (e.g. six months), when a threshold of application settings have been migrated (e.g. 80%) or any other means of determining when a user has most likely accessed all of the applications they intend to use on the destination computer.

FIG. 3 illustrates a method for migrating application settings for a user. The application settings are associated with one or more applications installed on a destination computer and are stored a first storage location.

At 302, the application settings virtualization component 110 stores corresponding application settings from a source computer 114 at a second storage location (e.g. virtual application settings 108) of the destination computer 102. In an embodiment, the corresponding application settings 112 from the source computer 114 are stored at the second storage location of the destination computer 102 in response to the destination computer 102 being configured to replace the source computer 114. In another embodiment, the application settings located at the first storage location (e.g. application settings 104) are accessed by the requesting application at a first layer and a second layer is defined under the first layer from which the corresponding application settings located at the second storage location are accessed by the requesting application.

At 304, the application settings virtualization component 110 receives a request from at least one of the applications 106 installed on the destination computer 102 for an application setting.

At 306, the application settings virtualization component 110 retrieves a first value for the requested application setting from the application settings stored in the first storage location (e.g. application settings 104). If the first value for the requested application setting does not correspond to a default value at 308, the application settings virtualization component 110 returns the first value to the requesting application at 310.

If the first value for the requested application setting corresponds to a default value at 308, the application settings virtualization component 110 retrieves a second value for the requested application setting from the corresponding application settings stored in the second storage location (e.g. virtual application settings 108). And, at 314 the application settings virtualization component 110 returns the second value to the requesting application.

In an alternative embodiment, instead of retrieving and returning the second value for the requested application setting as shown in steps 312 and 314, the application settings virtualization component 110 copies the second value for the requested application setting located at the second storage location (e.g. virtual application settings 108) to the first value for the requested application setting located at the first storage location (e.g. application settings 104) and deletes the second value at the second storage location. Next, the first value for the requested application setting located at the first storage location (now equal to second value copied from the second storage location) is returned to the user.

In another alternative embodiment, the source computer 114 and destination computer 102 are the same computer and the corresponding application settings 112 from the source computer 102 are installed on the destination computer 102 from a temporary storage location. In this embodiment, the corresponding application settings from the source computer 114 are stored on the destination computer 102 in response to one or more of the following: the operating system of the source computer is upgraded to a new version, the operating system of the source computer is reinstalled, the source computer is installed with a new operating system and the like.

Figure 4:
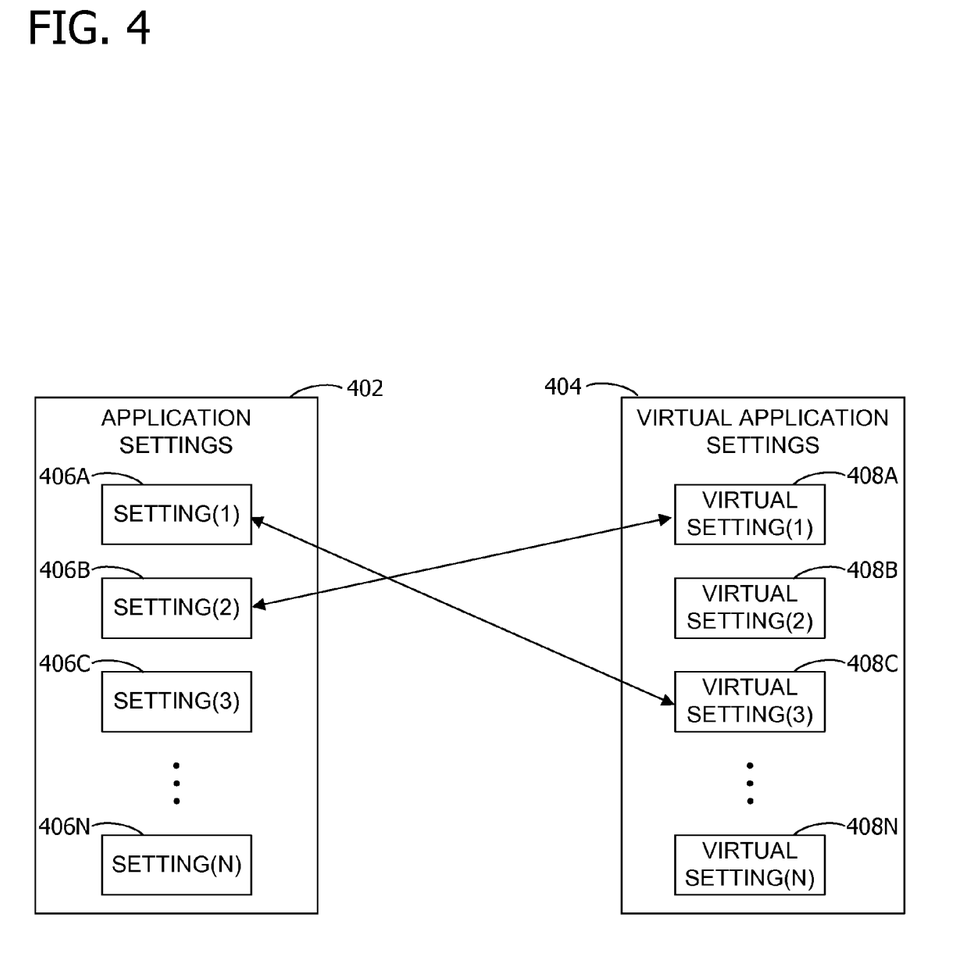
FIG. 4 is a block diagram illustrating an exemplary embodiment where only a subset of the application settings are migrated to the application settings of the destination computer from the virtual application settings.

FIG. 4 illustrates an embodiment where only a subset of the application settings are migrated to the application setting 402 from the virtual application settings 404 on the destination computer 102. For example, suppose the user executes an application, application(1) on the destination computer 102. Application(1) requires two application settings setting(1) 406A and setting(3) 406C where setting(1) 406A corresponds to virtual setting(3) 408C. In this case, the application setting virtualization component 110 would search the application settings for setting(1) 406A and setting(3) 406C. For setting(1) 406A, a value was not found, so the application setting virtualization component 110 copied the corresponding value (illustrated by the connecting lines shown in FIG.

4), virtual setting(3) 408C, from the virtual application settings 404. The value for setting(1) 406A (now equal to second value copied from the virtual setting(3) 408C) is returned to application(1). For setting(3) 406C, a value was found in the application settings 402, so the application setting virtualization component 110 returns its value to the application(1).

Continuing on, suppose the user now executes a second application, application(2) on the destination computer 102. Application(2) requires one application setting, setting(2) 406B, where setting(2) 406B corresponds to virtual setting(1) 408A. In this case, the application setting virtualization component 110 would search the application settings for setting (2) 406B and a value was not found. The application setting virtualization component 110 copies the corresponding value (illustrated by the connecting line), virtual setting(1) 408A, from the virtual application settings 404. The value for setting (2) 406B (now equal to second value copied from the virtual setting(1) 408A) is returned to application(2). In this example, there are other virtual application settings (e.g. virtual setting(2) 208B, virtual setting(N) 408N) which do not correspond to applications settings 402 of the destination computer 102. In this example, these other virtual setting will not be accessed by application of the destination computer 102 and may be deleted after some period of time (e.g. six months) or when it is determined that a user is likely to have executed all needed applications at least once.

Figure 5:
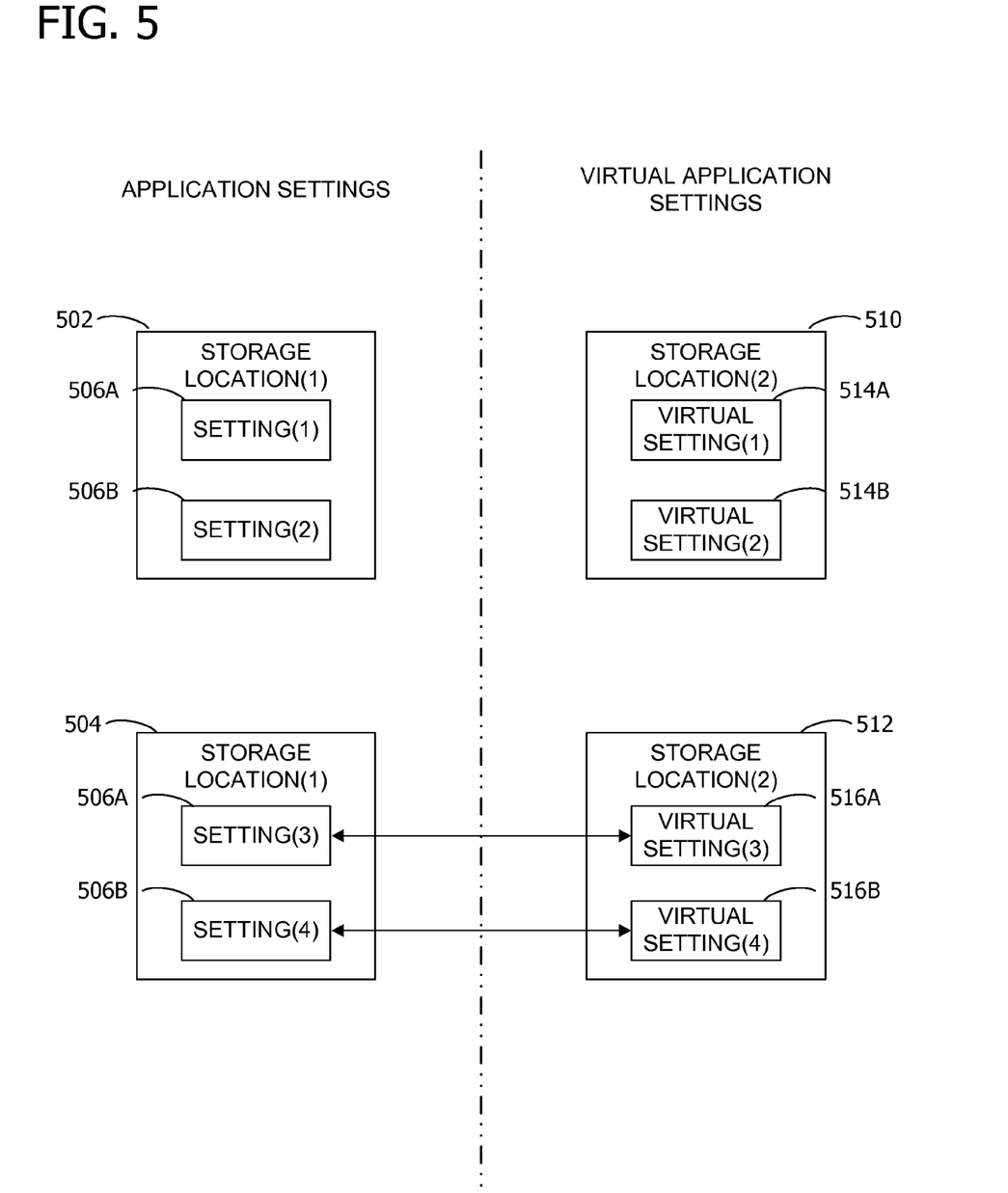
FIG. 5 is a block diagram illustrating an exemplary embodiment where the application settings for at least one of a plurality of applications are layered.

FIG. 5 illustrates an embodiment where only a subset of the application settings are layered. In this embodiment, an administrator of the destination computer 102 specifies at least one application installed on the destination computer 102 and only the second plurality of application settings associated with the specified the application are layered under the corresponding first plurality of application settings associated with the specified application. Advantageously, the applications of interest read the application settings migrated from the source computer 114, while other applications are unaffected by the migration.

For example, FIG. 5 illustrates an embodiment where two applications, application(1) and application(2) have been installed on the destination computer 102 and their corresponding application settings are stored at storage location(1) 502, 504. Application(1) includes two application settings, setting(1) 504A and setting(2) 504B while application(2) includes two application settings, setting(3) 506A and setting (4) 506B. The virtual application settings for application(1) and application(2) have also been copied from the source computer 114 to storage location(2) 510, 512. The virtual application setting for application(1) includes two application settings, virtual setting(1) 514A and virtual setting(2) 514B while application(2) includes virtual setting(3) 516A and virtual setting(4) 516B. In this embodiment, only settings of application(2) have been layered (shown by the connecting lines). In this case, virtual setting(3) 516A has been layered under setting(3) 506A and virtual setting(4) 516B has been layered under setting(4) 506B.

In this example, all application settings from the source computer 114 are copied to a temporary location (e.g. storage location(2) 510, 512) on the destination computer 102. Then, using virtualization, the source computer 114 information from the temporary location would be "layered" under the corresponding locations (e.g. storage location(1) 502, 504) of the destination computer 102. In an embodiment, a file "C:\Documents and Settings\User1\Application Data\MyApp\Data.ini" would appear to be copied to the same location on the destination computer 102, but only to the applications whose settings are migrated, application(2). The other application, application(1), would find that this file does not exist on the destination computer 102. In the case where the file with the same name already exists at the required location on the destination computer 102, the source computer 114 file would be discarded because application settings for the application already exist on the destination computer 102.

In another embodiment, the first time an application accesses an application setting that was migrated from the source computer 114 (e.g. virtual setting(3) 516A, virtual setting(4) 516B), the application setting is copied from the temporary location to the actual application setting location (e.g. setting(3) 506A, setting(4) 506B). In other words, the application setting is migrated and is accessible to all applications installed on the destination computer 102 and is no longer part of the virtualization. So, in effect, the application settings from the source computer 114 are copied to the destination computer 102 only as and when they are accessed by an administrator-defined set of applications.

When approximately all of the application setting accesses made by an application are not from the virtual application setting at storage location(2) 510, 512 because the needed application settings from the source computer 114 have been migrated out of storage location(2) 510, 512, the application's virtual application settings are no longer needed. And virtualization for the application may be stopped and any performance impact that may have been caused by the virtualization is eliminated.

Figure 6:
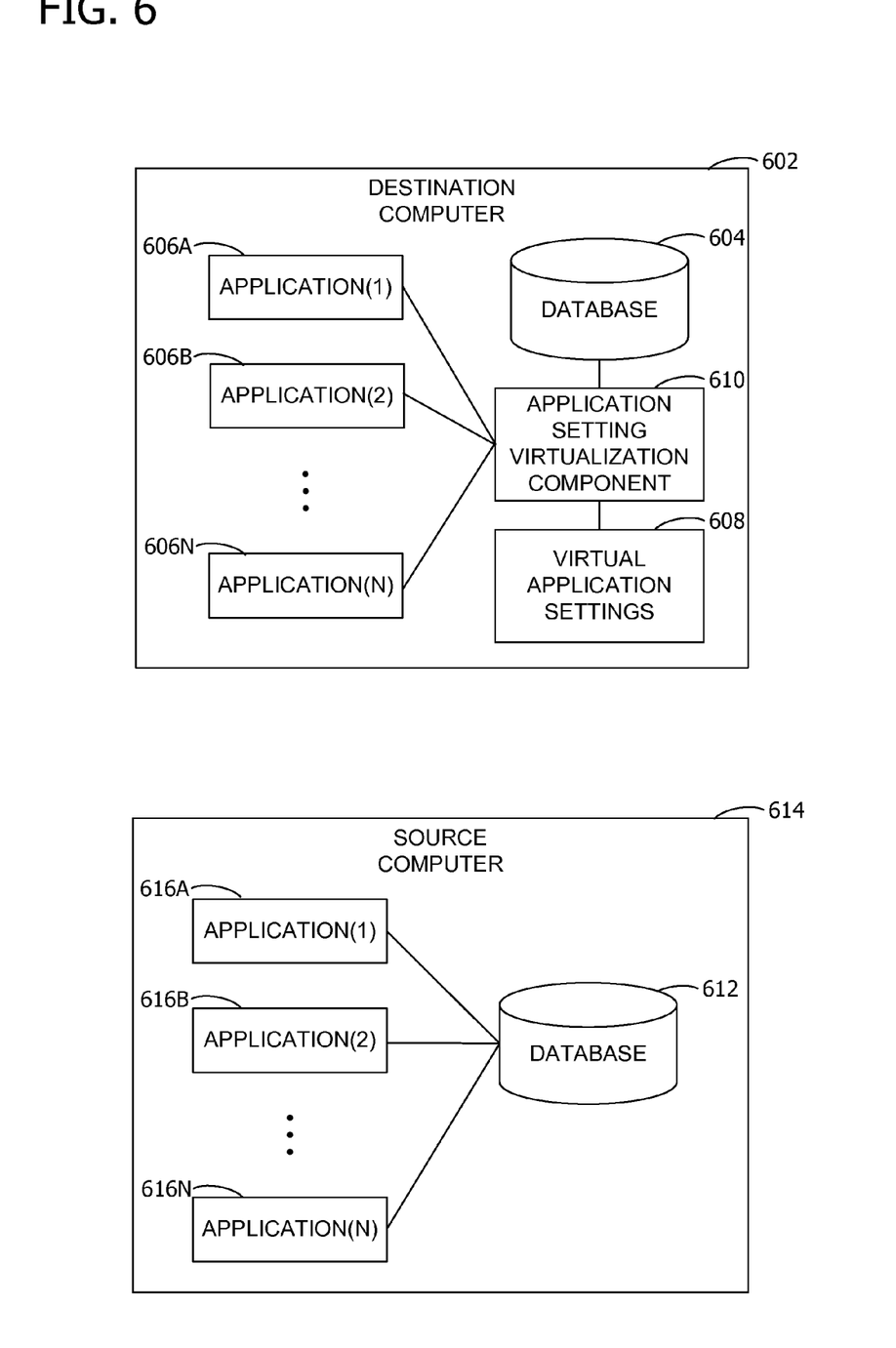
FIG. 6 is a block diagram illustrating one example of a suitable computing system environment in which application settings are stored in a database.

Referring now to FIG. 6, a system for application setting virtualization for a user of a destination computer 602 according to aspects of the invention is shown. The system includes a database 604 for storing application settings 104 associated with one or more applications 606, a storage location for virtual application settings 608 associated with at least one of the applications 606, and an application settings virtualization component 610. The database 604 includes one or more of the following: a profile for the user, application settings 104, types of documents that the user can create, a property sheet setting for folders and application icons of the user, hardware identifiers, port identifiers, etc.

The virtual application settings 608 of the user are copied from the application settings 112 of a source computer 614. The applications settings 112 are associated with one or more applications 616 of the source computer 614 and stored in a database 612. The database 612 includes one or more of the following: a profile for the user, application settings 112, types of documents that the user can create, a property sheet setting for folders and application icons of the user, hardware identifiers, port identifiers, etc.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for migrating application settings for a user from a source computer using virtualization, said application settings being associated with one or more applications installed on a destination computer, said destination computer storing the application settings for the user at a first storage location, said method comprising:
    storing corresponding application settings from the source computer at a second storage location on a storage device of the destination computer;
    receiving a request from at least one of the applications installed on the destination computer for an application setting corresponding to the at least one of the applications, said at least one application executing on the destination computer;
    retrieving a first value for the requested application setting from the application settings stored in the first storage location based on the request received from the at least one application executing on the destination computer;
    if the retrieved first value for the requested application setting does not correspond to a default value for said application setting, returning the retrieved first value to the requesting application;
    if the retrieved first value for the requested application setting corresponds to a default value:
        retrieving a second value for the requested application setting from the corresponding application settings stored in the second storage location on the storage device of the destination computer;
        copying the retrieved second value for the requested application setting located at the second storage location to the first value for the requested application setting located at the first storage location; and
        returning the retrieved second value to the requesting application.

2. The method of claim 1, wherein retrieving the second value for the requested application setting comprises deleting the second value for the requested application setting located at the second storage location.

3. The method of claim 1, wherein the source computer and destination computer are the same computer and the corresponding application settings from the source computer are installed on the destination computer from a temporary storage location.

4. The method of claim 1, wherein storing the corresponding application settings from the source computer is responsive to the destination computer replacing the source computer.

5. The method of claim 1, wherein the source computer and the destination computer are the same computer and wherein storing the corresponding application settings from the source computer is responsive to one or more of the following: the operating system of the source computer is upgraded to a new version, the operating system of the source computer is reinstalled, the source computer is installed with a new operating system.

6. The method of claim 1, wherein the application settings located at the first storage location are accessed by the requesting application at a first layer and further comprising defining a second layer under the first layer from which the corresponding application settings located at the second storage location are accessed by the requesting application.

7. A system for application settings migration for a user using virtualization, comprising:
    a first storage location of a computer-readable storage medium on a first storage device for application settings associated with one or more applications;
    a second storage location of a computer-readable storage medium on a second storage device for virtual application settings associated with at least one of the applications; and
    an application virtualization component stored on a computer-readable storage medium, said component executable by a computing device for:
        receiving a request from the at least one of the applications for an application setting corresponding to the at least one of the applications, said at least one application executing on a destination computing device;
        searching the first storage location for the requested application setting;
        if the requested application setting is found in the first storage location, returning the requested application setting from first storage location to the requesting application executing on the destination computing device;
        if the requested application setting is not found in the first storage location:
            searching the second storage location for the requested application setting;
            copying the requested application setting from the second storage location to a corresponding application setting at the first storage location;
            deleting the requested application setting from the second storage location; and
            returning the copied application setting from the first storage location to the requesting application executing on the destination computing device.

8. The system of claim 7, wherein the requested application setting comprises at least one of the following: a default value initialized the first time the user executes the requesting application; and a customized value specified by the user.

9. The system of claim 7, further comprising a first layer from which the requesting application accesses the application settings located at the first storage location and a second layer under the first layer from which the requesting application accesses the corresponding application settings located at the second storage location.

10. The system of claim 7, further comprising a database containing the application settings for the one or more applications and an operating system operating system component for continually referencing the database during operation, said database including one or more of the following: a profile for the user, the one or more applications, types of documents that the user can create, a property sheet setting for folders and application icons of the user, hardware identifiers, and port identifiers.

* * * * *